United States Patent [19]

Kodama et al.

[11] Patent Number: 4,744,367
[45] Date of Patent: May 17, 1988

[54] APPARATUS FOR MEASURING BLOOD FLOW SPEED USING AN ULTRASONIC BEAM

[75] Inventors: Mashio Kodama, Tokyo; Toshio Kondo, Kunitachi, both of Japan

[73] Assignee: Hitachi Medical Corp., Tokyo, Japan

[21] Appl. No.: 812,843

[22] Filed: Dec. 23, 1985

[30] Foreign Application Priority Data

Dec. 28, 1984 [JP] Japan ................... 59-279738

[51] Int. Cl.⁴ ............................................. G01N 29/02
[52] U.S. Cl. .................................. 128/663; 73/861.25; 364/510
[58] Field of Search ................. 128/660–661, 128/663; 73/861.06, 861.25, 861.27; 367/40, 42, 100; 364/821, 510, 422, 819, 604

[56] References Cited

U.S. PATENT DOCUMENTS

| 4,471,785 | 9/1984 | Wilson et al. | 364/821 |
| 4,484,478 | 11/1984 | Harkonen | 73/861.25 |
| 4,494,213 | 1/1985 | Thompson | 73/861.06 |
| 4,575,830 | 3/1986 | Ingram et al. | 364/422 |

Primary Examiner—Maryann Lastova
Attorney, Agent, or Firm—Antonelli, Terry & Wands

[57] ABSTRACT

An ultrasonic diagnosis apparatus comprises a probe for transmitting an ultrasonic beam toward a body having a blood vessel therein and a plurality of receiver circuits corresponding to sampling points of the body in a direction approximately perpendicular to the beam to produce respective intensities of reflected waves from the sampling points. A distribution of the reflected-wave intensities from the receiver circuits is measured at a predetermined interval of time. A shift between two successive intensity distributions thus measured is detected by a correlator, thereby determining a blood flow speed, in the blood vessel of the body, in the direction approximately perpendicular to the beam.

16 Claims, 6 Drawing Sheets

APPARATUS FOR MEASURING BLOOD FLOW SPEED USING AN ULTRASONIC BEAM

BACKGROUND OF THE INVENTION

The present invention relates to an ultrasonic diagnosis apparatus and in particular to a technique for measuring blood flow speed in a direction approximately perpendicular to an ultrasonic beam.

In the past, an ultrasonic pulse-Doppler method was put into practical use for measuring the speed of a moving part of a visceral organ such as a heart within a living body or a circulatory organ for blood or humor.

Only blood flow speed along the direction of an ultrasonic beam can be measured by using the conventional blood flow speed measuring system based on the Doppler method.

However, most of the blood vessels run in parallel with the body surface. When the blood flow speed is to be measured from the body surface, therefore, an ultrasonic probe must be tilted to align the beam direction with the blood vessel as much as possible. Accordingly, only the blood flow speed of extremely limited parts can be measured.

In general, blood flow speed is measured while the position of the blood vessel is being monitored on an ultrasonic tomographic (or cross-section) image. Although the ultrasonic tomographic image depicts the structual components located in a direction perpendicular to the beam with high resolution, it is extremely inferior in depicting the structural components located along the beam direction.

Accordingly, clear depiction of the flood vessel position in the ultrasonic tomographic image is contradictory to efficient measurement of the blood flow speed. This results in a problem of insufficient measurement of the blood flow speed of the flood vessels within the living body.

SUMMARY OF THE INVENTION

An object of the present invention is to provide a technique whereby the blood flow speed in a direction approximately perpendicular to an ultrasonic beam can be measured.

Another object of the present invention is to provide an ultrasonic diagnosis apparatus capable of measuring blood flow speed concurrently with the production of an ultrasonic tomographic image.

According to the present invention, there is provided an ultrasonic diagnosis apparatus comprising receiving means for receiving the reflected wave of an ultrasonic beam transmitted into a living body, measuring means for measuring the reflected-wave intensity distribution in a direction approximately perpendicular to the ultrasonic beam at a predetermined interval of time, and shift detecting means for detecting a shift between two successive reflected-wave intensity distributions from the measuring means to determine a blood flow speed, whereby the reflected-wave intensity distribution in the direction approximately perpendicular to the beam can be measured for a short time and the blood flow speed can be determined by detecting a transverse shift of the reflected-wave intensity distribution.

The receiving means includes a plurality of receiver circuits corresponding to sampling points in the direction perpendicular to the beam. The receiver circuits provide the intensities of the respective reflected-waves from the sampling points.

The apparatus may comprise means for producing a tomographic image so that the tomographic image as well as a value of the blood flow speed can be displayed.

DESCRIPTION OF THE PREFERRED EMBODIMENTS

Figure 1:
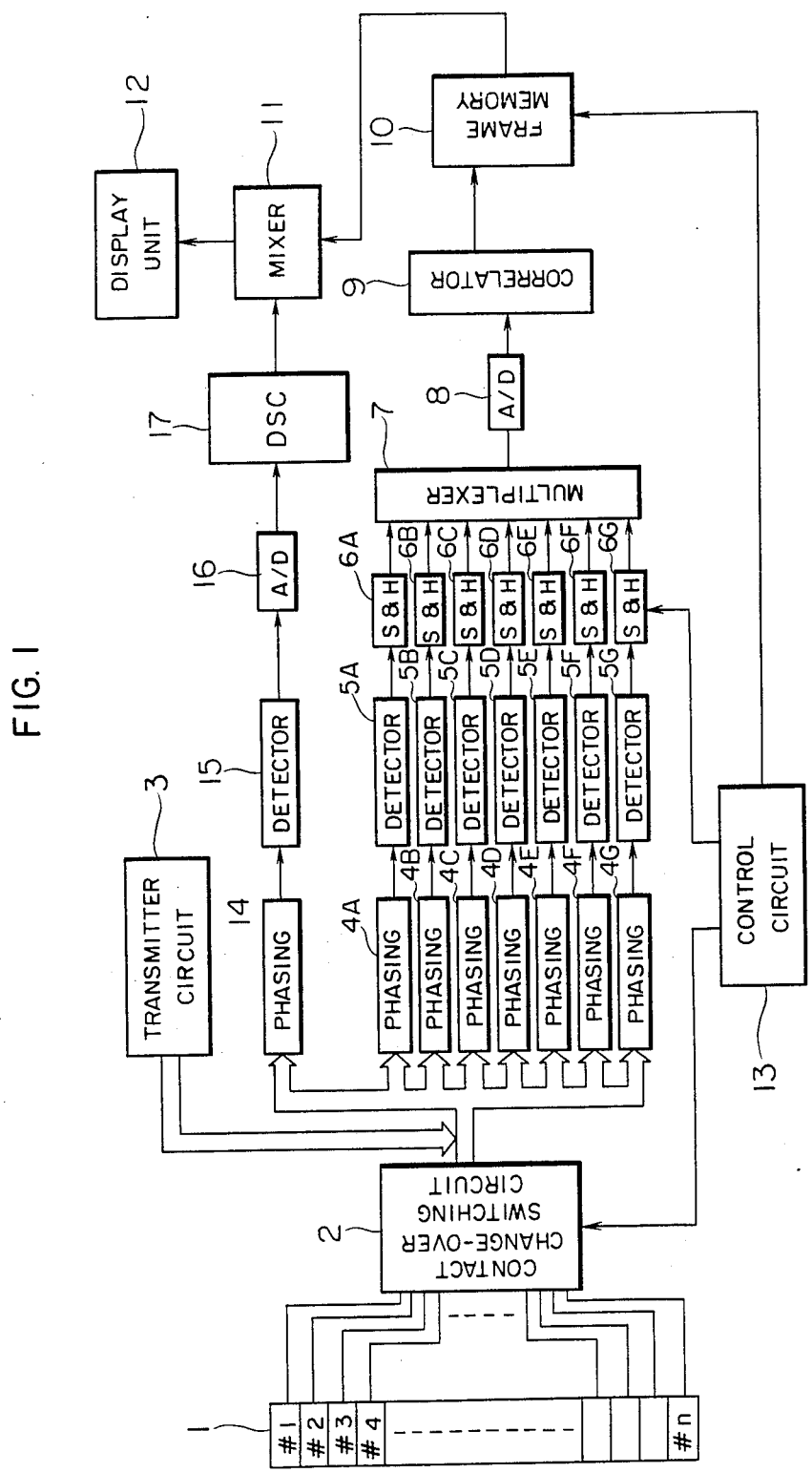
FIG. 1 is a block diagram schematically showing the entire configuration of an ultrasonic diagnosis apparatus according to an embodiment of the present invention.

The present invention will now be described with reference to embodiments by means of the accompanying drawings. In the drawings, like reference symbols refer to components having identical functions.

Referring to FIG. 1, showing a block diagram showing of the entire schematic configuration of an ultrasonic diagnosis apparatus according to an embodiment of the present invention, an ultrasonic probe 1 includes a plurality (for example, 10) of (say, 80) ultrasonic oscillator (piezoelectric vibrator) elements arranged in an array form. Out of these ultrasonic oscillator elements #1, #2, #3, ... #n, a predetermined number (for example, 10) of oscillator elements are selected by a contact change-over switching circuit 2. An ultrasonic beam is emitted into a body under consideration from the selected elements by a transmitter circuit 3. The reflected wave is received by phasing circuits 4A to 4G for blood flow speed measurement having their directivities which are different from each other. The received signals are detected by detectors 5A to 5G for blood flow speed measurement. The detected signals which are respectively in proportion to reflected-wave intensities are held in sample and hold circuits 6. The outputs of the sample and hold circuits 6A to 6G are successively selected to be supplied to an analog-digital (A/D) converter 8 by a multiplexer 7. The resultant digital signal is supplied to a correlator 9 for deriving a correlation between the intensity distribution obtained by the first ultrasonic beam transmission and the intensity distribution obtained by the succeeding ultrasonic beam transmission. The output of the correlator 9 is temporarily stored in a frame memory 10 and then supplied to a display unit 12 such as a cathode ray tube (CRT) monitor via a mixer 11 for mixing the output of the correlator with an ultrasonic tomographic image signal. The output of the correlator is thus displayed as the blood flow speed together with the ultrasonic tomographic image on the same screen of the display unit 12.

The change-over operation of the contact change-over switching circuit 2 is controlled by a control circuit 13. When it is desired to display the ultrasonic tomographic image and the blood flow speed simultaneously at real time, the oscillator elements for tomographic image production and the oscillator elements for blood flow measurement are alternately selected among the oscillator elements #1, #2, #3, ... #n by the contact change-over switching circuit 2. This is realized in such a manner that the oscillator elements for tomographic image production are successively selected by scanning while the oscillator elements for blood flow speed measurement are so selected that intended sample (measuring) points may be repeatedly selected.

A phasing circuit 14 for ultrasonic tomographic images is provided with the received signals of oscillator elements which are selected out of the elements #1, #2, #3, ... #n by the contact change-over switching circuit 2. After being phased in the phasing circuit 14, the received signals are detected by an ultrasonic tomographic image detector circuit 15 and converted into a digital signal by an A/D converter 16. The resultant digital signal is stored in a digital scan converter (DSC) 17. The video signal of the ultrasonic tomographic image stored in the digital scan converter 17 is read out and supplied to the display unit 12 via the mixer 11 to be displayed thereon.

Figure 2:
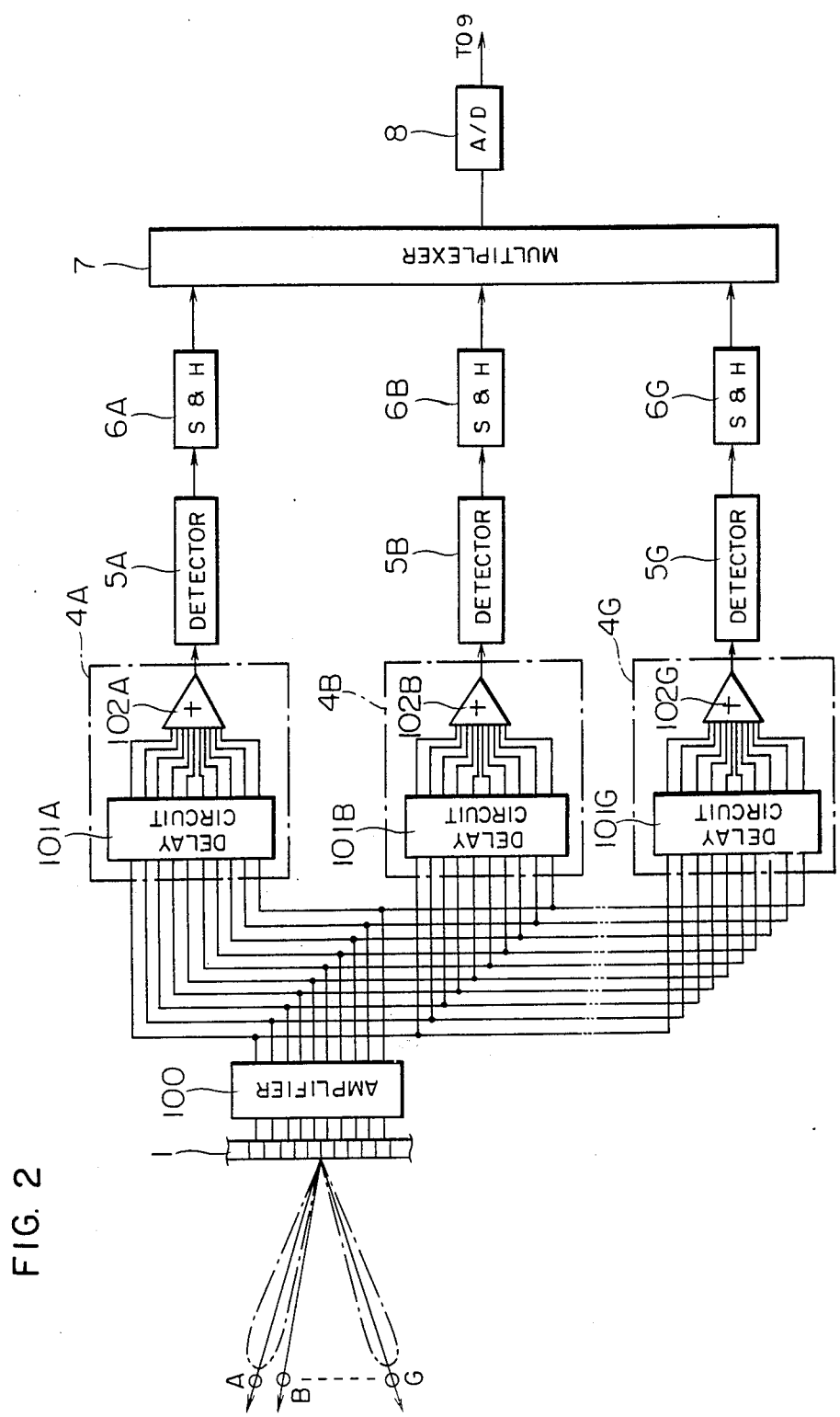
FIG. 2 is a block diagram showing an example of a concrete configuration of phasing circuits for blood flow speed measurement having different directivities.

An example of a configuration of the phasing circuits 4A to 4G for blood flow speed measurement is shown in FIG. 2. The circuits 4A to 4G of FIG. 2 have different directivities by sector-scanning the beam for measuring the blood flow speed.

In the case of sector scan, the transmitter circuit 3 is designed to provide a broad directivity to an ultrasonic beam. Since such a transmitter circuit 3 is known, detailed description of the circuit will be omitted. The receiver circuit has parallel phasing circuits 4A to 4G for blood flow speed measurement respectively having different directivities. Each of the phasing circuit 4A to 4G is composed of one of delay circuits 101A to 101G having different delay characteristics and one of adders 102A to 102G. The directivities of the phasing circuits 4A to 4G are determined by their respective delay amounts. That is to say, the directivities of the phasing circuits 4A to 4G are determined by the delay characteristics of the delay circuits 101A to 101G, respectively. Reference numeral 100 denotes an amplifier circuit.

Respective delay amounts of channels (or delay elements) in each of the delay circuits 101A to 101G are defined to provide the delay characteristic of that delay circuit. For example, a delay amount of that channel of the delay circuit 101A associated with an oscillator element distant from the center of the probe 1 by y is as follows:

$$\tau = \frac{C}{y\sin\theta \left\{ 1 - \frac{1}{2}\left(\frac{y}{x}\right)\sin\theta \right\}}$$

Here, x is the distance of said oscillator element from the center of the probe and $\theta$ is an angle between the direction A and the normal line of the probe surface. A method of determining the delay amounts is detailed in J. Sound Vib. Vol. 8, No. 3, 1968, pp. 390 to 394.

The operation of the phasing circuits 4A to 4G for blood flow speed measurement will now be described by referring to FIG. 2.

The wave which is reflected at a sampling point A of a part to be examined is received by all the oscillator elements and amplified by the amplifier circuit 100. The amplified signal which is phased by the phasing circuit 4A for blood flow speed measurement has a receiving directivity A. Time in which the reflected wave from the sampling point A returns to the oscillator element, is determined depending on the distance between the sampling point A and the center of the oscillator element array (or the probe 1). If this time is preset in the control circuit 13, the reflected-wave intensity at the sampling point A is phased in the delay circuit 101A and the addrer 102A of the phasing circuit 4A, detected by the detector 5A and held in the sample and hold circuit 6A. In the same way, the reflected-wave intensities of sampling points B to G are held in the sample and hold circuits 6B to 6G, respectively.

With the above-described operation, the reflected-wave intensities of the sampling points A to G for the signal received at a time are held in the sample and hold circuits 6A to 6G, respectively. The outputs of the sample and hold circuits 6A to 6G are scanned by the multiplexer 7 to provide a reflected-wave intensity distribution in a direction approximately perpendicular to the beam for one beam transmission. Examples of the reflected-wave intensity distribution in the direction approximately perpendicular to the beam thus obtained are shown in FIGS. 3A and 3B.

Figure 3A:
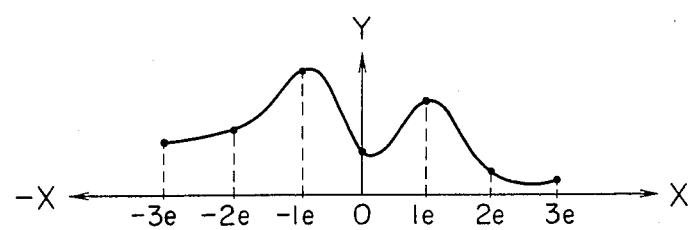
FIGS. 3A and 3B show the movement of the reflected wave intensity distribution in a direction approximately perpendicular to an ultrasonic beam with time.
Figure 3B:
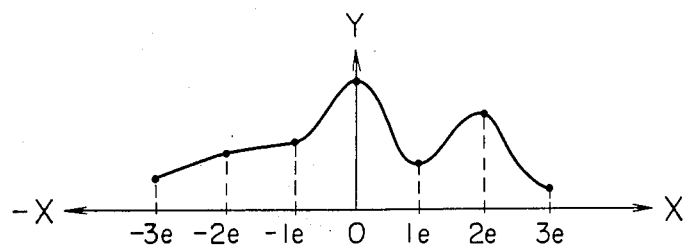

In FIGS. 3A and 3B, the Y coordinate represents the reflected-wave intensity (voltage: V) and the X coordinate represents the distance (mm) between each sampling point and the center of the sampling points A to G. FIG. 3A shows a reflected-wave intensity distribution derived by the first ultrasonic beam transmission and FIG. 3B shows a reflected-wave intensity distribution derived by the next (second) ultrasonic beam transmission.

In general, an interval t between the successive transmission attempts can be related to the sound velocity $v_s$ within the living body and the depth D of the measuring point as follows:

$$t \geq \frac{2D}{v_s}$$

The interval t is generally 100 to 400 μs.

When blood corpuscles within the blood vessel flow along the blood flow, a shift corresponding to (flow speed) ×(interval between transmission attempts) is produced between an intensity distribution derived by the first ultrasonic transmission attempt and that derived by the second ultrasonic transmission attempt. By detecting this shift, the blood flow speed can be measured. An example of correlation for detecting the shift will now be explained in conjunction with the case where the number of sampling points is 7. Assuming that e is the sampling interval and n is a natural number, the value of reflected-wave intensity $y_1$ measured at the first ultrasonic transmission and the value of reflected-wave intensity $y_2$ measured at the second ultrasonic transmission can be represented as $$y_1 = f_1(x) = f_1(n \cdot e)$$

$$y_2 = f_2(x) = f_2(n \cdot e).$$

From the reflected-wave intensity value $y_1$ measured at the first beam transmission and the reflected-wave intensity value $y_2$ measured at the second beam transmission, the correlation caused by the movement with time of the reflected-wave intensity distribution taken in a direction approximately perpendicular to the beam can be represented as $$R(d) = 1/7 \sum_{n=-3}^{3} \{f_1(n \cdot e) \times f_2(n \cdot e - d)\} \quad (1)$$

In the equation (1), a d represents the amount or distance of blood movement. With respect to the blood flow speed v [m/sec] and the transmission interval $T_o$ [sec] of the ultrasonic beam, d can be represented as $d = T_o \times v$. By substituting this value of d into the equation (1), it follows that $$R(d) = 1/7 \sum_{n=-3}^{3} \{f_1(n \cdot e) \times f_2(n \cdot e - T_o v)\} \quad (2)$$

In the equation (2), there involves a measurement error of $\pm e/2T_o$ caused by the sampling interval. For reducing this error, it is effective means to use the average value of R(d) over a certain time interval. Assuming that the transmission pulse interval is 200 μs and the interval over which the average value is taken is 20 ms, the error can be reduced to approximately $1/\sqrt{100} = 1/10$ from the relation 20 ms/200 μs = 100. If the interval over which the average value is taken is lengthened, however, the response in the flow speed measurement is slowed down. Therefore, it is necessary to choose the interval in accordance with the application. For example, the averaging is meaningless when the blood flow speed varies considerably. The averaging is especially effective for a slow flow speed.

As is apparent from the foregoing, according to the present embodiment, the blood flow speed can be detected by transmitting an ultrasonic beam toward a body under consideration, receiving the reflected wave by the phasing circuits 4A to 4G having different directivities, sampling and holding the phased signals in the sample and hold circuits 6A to 6G, and deriving the correlation of the movement with time of the reflected-wave intensity distribution in a direction approximately perpendicular to the beam on the basis of the reflected-wave intensity values measured at the first beam transmission and the reflected-wave intensity values measured at the second beam transmission, to detect a transverse shift of the reflected-wave intensity distribution.

Figure 4:
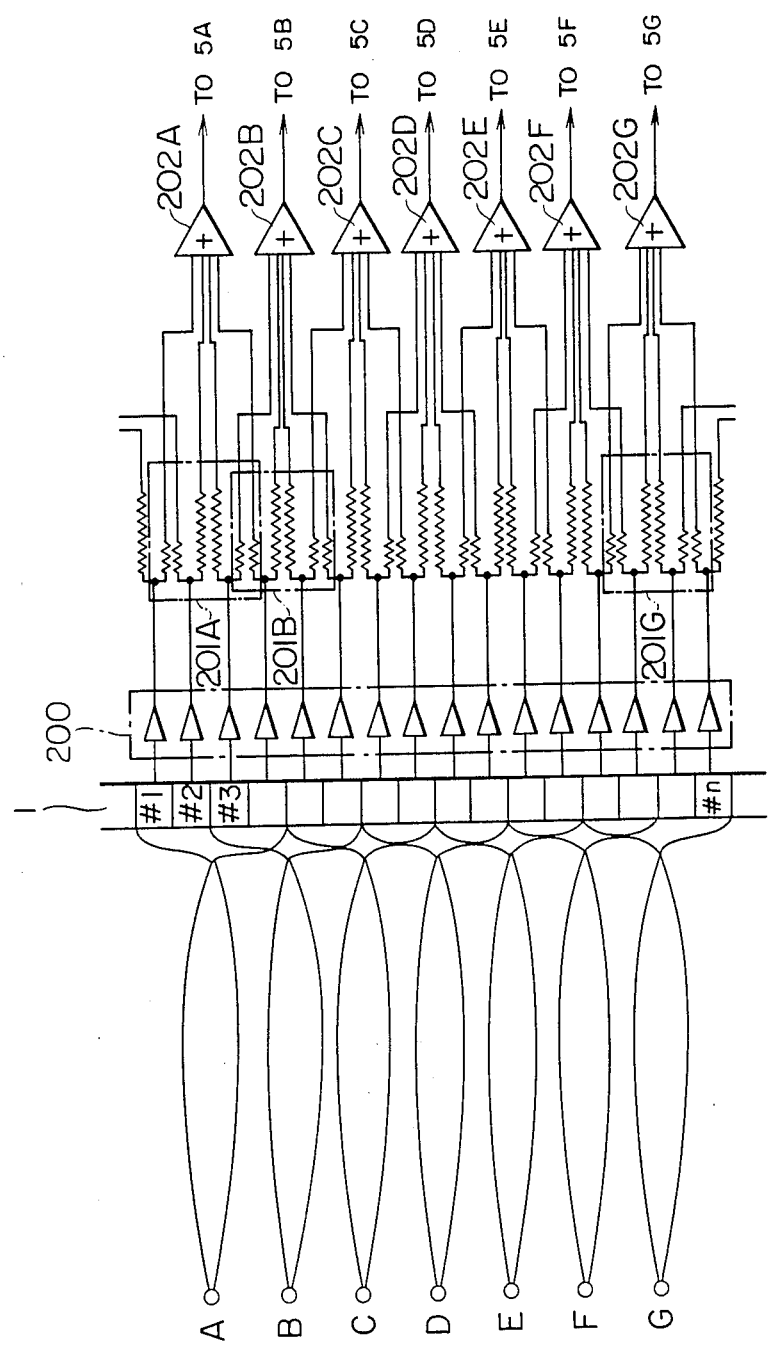
FIG. 4 is a block diagram showing the configuration of phasing circuits which are used in another embodiment of the present invention.

FIG. 4 shows another embodiment of the present invention in which a plurality of phasing circuits having the same directivity are used instead of the phasing circuits shown in FIG. 2 having different directivities.

In an embodiment of FIG. 4, the transmission/reception positions of ultrasonic waves are different for the respective phasing circuits. Numeral 200 represents an amplifier circuit, numerals 201A to 201G delay line circuits, and numerals 202A to 202G adders.

As illustrated in FIG. 4, the phasing circuits in this embodiment is constituted by selecting a plurality of sets of oscillator elements from the oscillator element array of the ultrasonic probe 1. In the present embodiment, since the transmission/reception position of an ultrasonic wave is changed though the phasing circuits the same directivity, the probe portion of the ultrasonic beam can be reduced, resulting in an improved S/N value.

Figure 5:
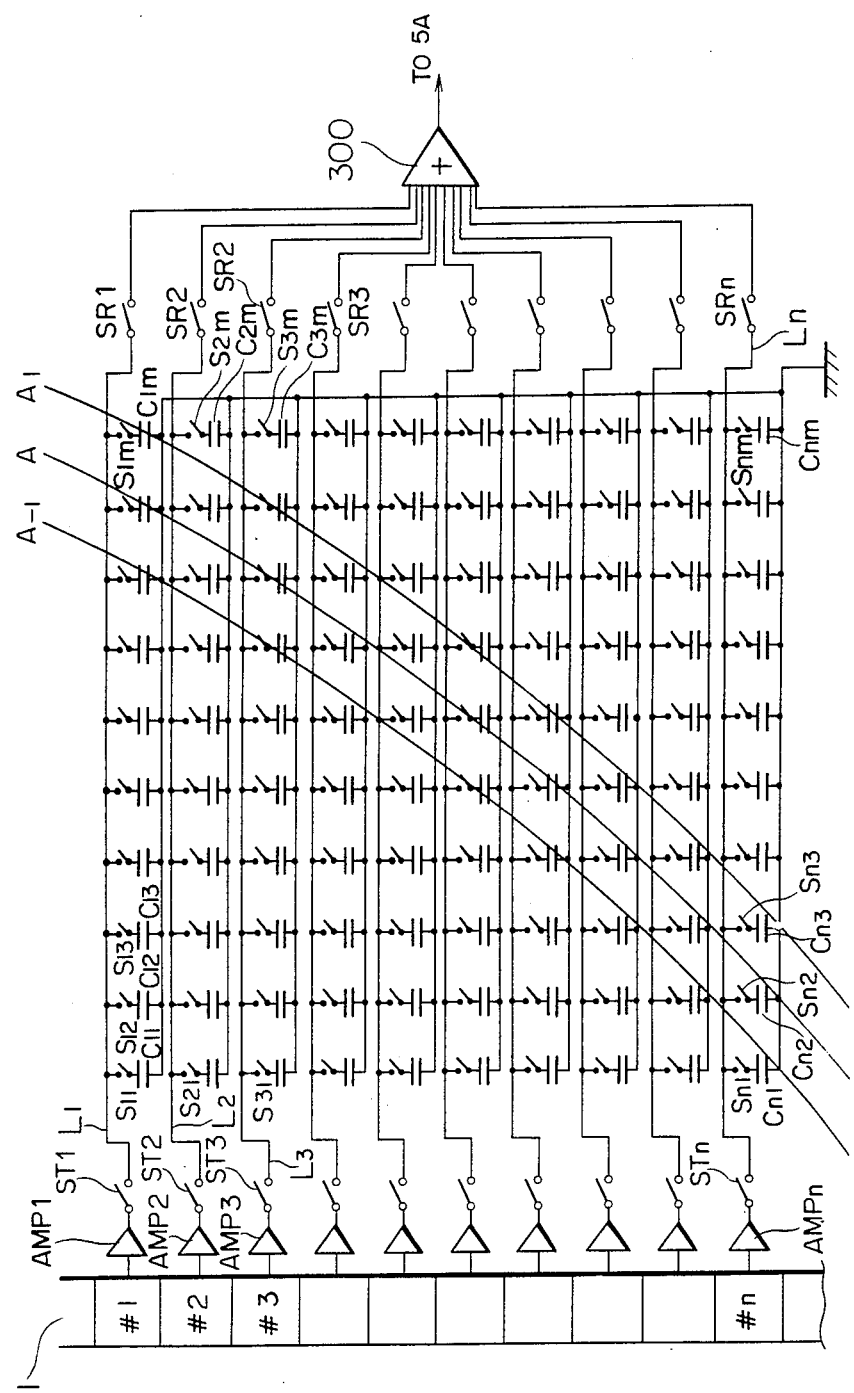
FIG. 5 is a circuit diagram showing the configuration of a phasing circuit which is used in still another embodiment of the present invention.

FIG. 5 shows still another embodiment of the present invention in which a phasing circuit composed of switched capacitors are used as an alternative to the phasing circuit for blood flow speed measurement shown in FIG. 2. The phasing circuit shown in FIG. 5 corresponds to the phasing circuit 4A of FIG. 2.

In this embodiment, among signals received by the oscillator elements #1, #2, . . . #n of the ultrasonic probe 1, the signals around a sampling point are stored in capacitors as illustrated in FIG. 5. For example, the reflected-wave intensity at the sampling point A shown in FIG. 2 is obtained by reading out signals stored in capacitors located on a curve A of FIG. 5 and adding those signals together. However, the intensity of the ultrasonic signal is derived by means of detection. In addition to the sum of the signals stored in the capacitors located on the curve A, therefore, it is necessary to produce the sum of signals stored in capacitors located on a curve $A_1$ or $A_{-1}$ running in parallel with the curve A, which are added respectively.

In FIG. 5, amplifiers AMP1, AMP2, AMP3, . . . AMPn have inputs connected to the oscillator elements #1, #2, #3, . . . #n of the ultrasonic probe 1 and outputs connected to ends of switches ST1, ST2, ST3, . . . STn. The remaining ends of the switches ST1, ST2, ST3, . . . STn are connected to ends of signal lines L1, L2, L3, . . . Ln. The remaining ends of the signal lines L1, L2, L3, . . . Ln are connected to an adder 300 via switches SR1, SR2, SR3, . . . SRn. Switches S11, S12, S13, . . . S1m; S21, S22, S23, . . . S2m; . . . and Sn1, Sn2, Sn3, . . . Snm are provided for charging and discharging information storage capacitors C11, C12, C13, . . . C1m; C21, C22, C23, . . . C2m; . . . and Cn1, Cn2, Cn3, . . . Cnm. As illustrated in FIG. 5, the respective signal lines L1, L2, L3, . . . and Ln from the switches ST1, ST2, ST3, . . . and STn are connected to the capacitors C11, C12, C13, . . . C1m; C21, C22, C23, . . . C2m; . . . and Cn1, Cn2, Cn3, . . . Cnm via switches S11, S12, S12, . . . S1n; S21, S22, S23, . . . S2m; . . . and Sn1, Sn2, Sn3, . . . Snm, respectively. The output of the amplifier 300 is connected to the detector 5A shown in FIG. 2. In FIG. 5, phasing circuits corresponding to the phasing circuits 4B to 4G are omitted from illustration. Each of those phasing circuits is constructed by the same switched capacitor configuration as that shown in FIG. 5. Each phasing circuit is connected to the oscillator elements #1, #2, #3, . . . #n through the amplifiers AMP1, AMP2, AMP3, . . . AMPn.

The operation of the phasing circuit will now be described by referring to FIG. 5.

Figure 6:
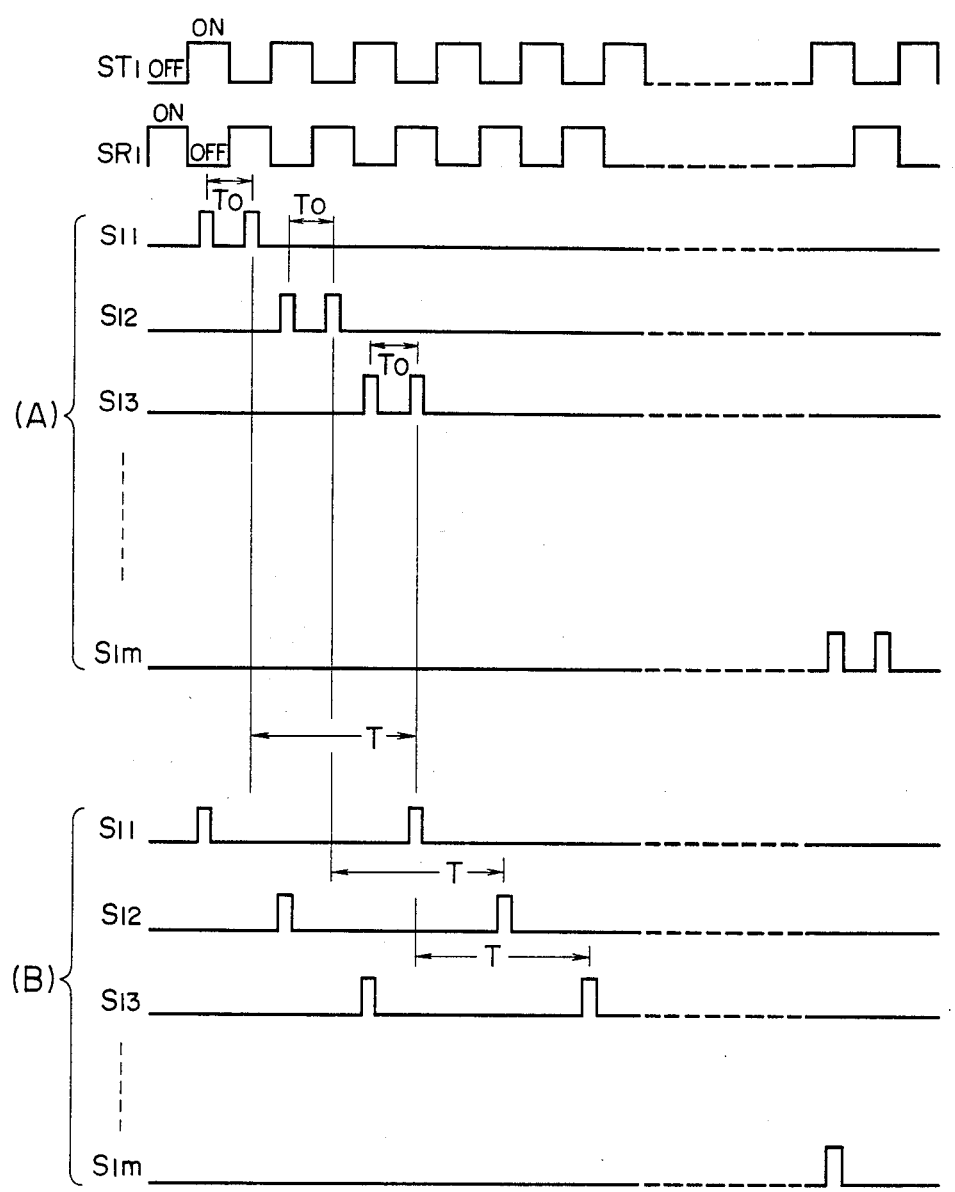
FIG. 6 is a timing chart useful in explaining the operation of the circuit shown in FIG. 5.

The received signal supplied from the oscillator element #1 of the ultrasonic probe 1 is sampled each time the switch ST1 is closed with the switch SR1 opened. If the switch S11 is closed, the sample signal is stored in the capacitor C11. The charges stored in the capacitor C11 are read by closing the switch S11 with the switch ST1 opened and the switch SR1 closed. By carrying out the similar operation for the switches S12 to S1m, the operations of write in and read from the capacitors C12 to C1m can be sequentially carried out. In reading the signals written in the capacitors C11, C12, C13, . . . C1m, the signal delay time is the shortest in the case where the signal of the capacitor C11 is read immediately after the signal has been written in the capacitor C11. As a capacitor to be written immediately before the read timing of the capacitor C11 is changed from C12 to C13, . . . C1m, the delay time can be increased. Examples of these situations are illustrated in FIG. 6. Referring to FIG. 6, (A) shows the case where the signal of a certain capacitor is read immediately after the signal has been written in that capacitor and before a signal is written in the next capacitor. In this case, the signal is delayed by $T_o$. (B) shows the case where the signal of a certain capacitor is read after two clock periods from the writing to that capacitor. During the two-clock periods, signals are written in two succeeding capacitors. In this case, the signal delay of T is provided. Thus, a delay amount can be controlled by changing the read timing.

In realizing the present invention, the write timing is made in such a manner that the switches S11, S21, S31, ... Sn1 simultameously operate, thereafter the switches S12, S22, S32, ... Sn2 simultaneously operate, etc. A read operation is made in such a manner that switches located on the curve A (or $A_{-1}$ or $A_1$) shown in FIG. 5 are closed at the same time. In this case, the signal delay is shortened in the order of the oscillator elements #1, #2, #3, ... #n. The delay depends on a distance from the heading capacitor C11, C21, C31, ... or Cn1 to the capacitor located on the curve A.

Means for deriving delay values which provides directivity when the probe deflects the ultrasonic beam is known as described in ULTRASONIC, July 1968, p. 153, for example. Since the detailed explanation is contained in the publication, the means will not be described here.

The signals supplied from the oscillator elements #1, #2, #3, ... #n and thus delayed are added together by the adder 300, resulting in the operation similar to that of the phasing circuit for blood flow speed measurement shown in FIG. 2.

As has been described, according to the present invention, the blood flow speed in a direction approximately perpendicular to a transmitted ultrasonic beam can be detected by measuring the reflected-wave intensity distribution in the direction approximately perpendicular to the beam at a predetermined interval of time and detecting a shift between two successive reflected-wave intensity distributions.

We claim:

1. An ultrasonic diagnosis apparatus comprising:
    an ultrasonic probe for transmitting an ultrasonic beam toward a body having a blood vessel at a predetermined transmission interval;
    receiving means for receiving a reflected wave of each transmitted ultrasonic beam from said body;
    measuring means for measuring a reflected-wave intensity distribution, in a direction transverse to the transmitted ultrasonic beam, output from said receiving means at a predetermined interval of time corresponding to said predetermined transmission interval;
    shift detecting means for detecting a shift between two successive reflected-wave intensity distributions measured by said measuring means to determined a blood flow speed in the blood vessel of said body;
    said receiving means including a plurality of receiver circuits corresponding to a plurality of sampling points on said body in the direction transverse to the transmitted ultrasonic beam, said receiver circuits providing intensities of the reflected waves from said sampling points, respectively;
    wherein said receiver circuits have different directivities, and each of said receiver circuits includes a delay circuit having a plurality of delay elements connected to ultrasonic oscillator elements in said ultrasonic probe, respectively, and an adder for producing a sum of outputs of said delay elements, said delay elements in each delay circuit providing predetermined delays based on the directivity of that delay circuit.

2. An ultrasonic diagnosis apparatus according to claim 1, further comprising:
    signal processing means for receiving a reflected wave of the transmitted ultrasonic beam from said body to produce a video signal corresponding to an image of a cross-section of said body; and
    display means for receiving the video signal from said signal processing means and data of the blood flow speed from said shift detecting means to concurrently display the cross-section image and a value of the blood flow speed.

3. An ultrasonic diagnosis apparatus according to claim 1, wherein said shift detecting means includes a correlator for determining a correlation of relative movement between two successive reflected-wave intensity distributions measured by said measuring means to determine the blood flow speed.

4. An ultrasonic diagnosis apparatus comprising:
    an ultrasonic probe for transmitting an ultrasonic beam toward a body having a blood vessel at a predetermined transmission interval;
    receiving means for receiving a reflected wave of each transmitted ultrasonic beam from said body;
    measuring means for measuring a reflected-wave intensity distribution, in a direction transverse to the transmitted ultrasonic beam, output from said receiving means at a predetermined interval of time corresponding to said predetermined transmission interval;
    shift detecting means for detecting a shift between two successive reflected-wave intensity distributions measured by said measuring means to determine a blood flow speed in the blood vessel of said body;
    said receiving means including a plurality of receiver circuits corresponding to a plurality of sampling points on said body in the direction transverse to the transmitted ultrasonic beam, said receiver circuits providing intensities of the reflected waves from said sampling point, respectively;
    wherein said receiver circuits have the same directivity, and each of said receiver circuits includes a delay circuit having a predetermined number of delay elements connected to selected ones of ultrasonic oscillator elements in said ultrasonic probe, respectively, and an adder for producing a sum of outputs of said delay elements.

5. An ultrasonic diagnosis apparatus according to claim 4, further comprising:
    signal processing means for receiving a reflected wave of the transmitted ultrasonic beam from said body to produce a video signal corresponding to an image of a cross-section of said body; and
    display means for receiving the video signal from said signal processing means and data of the blood flow speed from said shift detecting means to concurrently display the cross-section image and a value of the blood flow speed.

6. An ultrasonic diagnosis apparatus according to claim 4, wherein said shift detecting means includes a correlator for determining a correlation of relative movement between two successive reflected-wave intensity distributions measured by said measuring means to determine the blood flow speed.

7. An ultrasonic diagnosis apparatus comprising:

an ultrasonic probe for transmitting an ultrasonic beam toward a body having a blood vessel at a predetermined transmission interval;

receiving means for receiving a reflected wave of each transmitted ultrasonic beam from said body;

measuring means for measuring a reflected-wave intensity distribution, in a direction transverse to the transmitted ultrasonic beam, output from said receiving means at a predetermined interval of time corresponding to said predetermined transmission interval;

shift detecting means for detecting a shift between two successive reflected-wave intensity distributions measured by said measuring means to determine a blood flow speed in the blood vessel of said body;

said receiving means including a plurality of receiver circuits corresponding to a plurality of sampling points on said body in the direction transverse to the transmitted ultrasonic beam, said receiver circuits providing intensities of the reflected waves from said sampling points, respectively;

each of said receiver circuits including a plurality of signal lines having input ends thereof connected through first switches to ultrasonic oscillator elements in said ultrasonic probe, respectively, and output ends thereof connected through second swtiches to an adder, wherein a predetermined number of capacitors are connected to each of said signal lines through third switches associated therewith such that on each signal line when the third switch associated with a selected one of the capacitors is turned on with the first switch turned on and the second switch turned off, a reflected-wave signal from the corresponding oscillator element is written into the selected capacitor and when the third swtich is again turned on with the first switch turned off and the second switch turned on, the written signal is read from the selected capacitor to be supplied to said adder.

8. An ultrasonic diagnosis apparatus according to claim 6, further comprising:

signal processing means for receiving a reflected wave of the transmitted ultrasonic beam from said body to produce a video signal corresponding to an image of a cross-section of said body; and display means for receiving the video signal from said signal processing means and the data of the blood flow speed from said shift detecting means to concurrently display the cross-section image and a value of the blood flow speed.

9. An ultrasonic diagnosis apparatus according to claim 7, wherein said shift detecting means includes a correlator for determining a correlation of relative movement between two successive reflected-wave intensity distributions measured by said measuring means to determine the blood flow speed.

10. A blood flow speed measuring apparatus comprising:

a single ultrasonic probe including a plurality of ultrasonic oscillator elements for transmitting an ultrasonic beam toward a body having a blood vessel at a predetermined transmission interval and for receiving a reflected ultrasonic wave;

receiving means including a plurality of receiver circuits which have different directivities for receiving reflected waves from said body for one ultrasonic beam transmitted from predetermined ones of said plurality of ultrasonic oscillator elements;

reflected-wave intensity distribution measuring means for measuring, a distribution of reflected-wave intensities in a direction intersecting the direction of transmission of the ultrasonic beam from the ultrasonic oscillator elements, on the basis of outputs of said receiver circuits at a predetermined interval of time corresponding to said predetermined transmission interval; and blood flow speed measuring means for detecting a shift between two successive reflected-wave intensity distributions measured by said reflectd-wave intensity distribution measuring means to measure a blood flow speed in the blood vessel of said body;

wherein the reflected waves of the ultrasonic beam transmitted from said predetermined ones of said plurality of ultrasonic oscillator elements are received by the same said predetermined ones of said plurality of ultrasonic oscillator elements.

11. A blood flow speed measuring apparatus according to claim 10, wherein each of said receiver circuits includes a delay circuit having a plurality of delay elements connected to said plurality of ultrasonic oscillator elements, respectively, and an adder for producing a sum of outputs of said delay elements, wherein the delay elements in each delay circuit provide predetermined delays depending on the directivity of each delay circuit.

12. A blood flow speed measuring apparatus according to claim 10, wherein each of said receiver circuits includes a plurality of signal lines having input ends thereof connected through first switches to said plurality of ultrasonic oscillator elements, respectively, and output ends thereof connected through second switches to an adder, wherein a predetermined number of capacitors are connected to each of said signal lines through third switches associated therewith such that on each signal line when the third switch associated with a selected one of the capacitors is turned on with the first switch turned on and the second switch turned off, a reflected-wave signal from the corresponding oscillator element is written into the selected capacitor and when the third switch is again turned on with the first switch turned off and the second switch turned on, the written signal is read from the selected capacitor to be supplied to said adder.

13. A blood flow speed measuring apparatus according to claim 10, further comprising:

signal processing means for receiving a reflected wave of the transmitted ultrasonic beam from said body to produce a video signal corresponding to an image of a cross-section of said body; and display means for receiving the video signal from said signal processing means and data of the blood flow speed from said blood flow speed measuring means to concurrently display the cross-section image and a value of the blood flow speed.

14. A blood flow speed measuring apparatus according to claim 10, wherein said blood flow speed measuring means includes a correlator for determining a correlation of relative movement between the two successive reflected-wave intensity distributions measured by said measuring means to determine the blood flow speed.

15. A blood flow speed measuring apparatus according to claim 10, further comprising a switching circuit for dividing the plurality of oscillator elements into a plurality of blocks composed of a predetermined number of oscillator elements, and a control circuit for controlling the blocks of oscillator elements to sequentially switch between transmission of the ultrasonic beam and reception of the ultrasonic wave.

16. A blood flow speed measuring apparatus according to claim 10, further comprising a control circuit for simultaneously driving all of said ultrasonic oscillator elements to transmit said ultrasonic beam in a predetermined direction, and for controlling the transmitted beam so as to sequentially shift the predetermined direction.

* * * * *